United States Patent [19]

Mutsuda

[11] Patent Number: 5,795,935
[45] Date of Patent: Aug. 18, 1998

[54] THERMOPLASTIC COMPOSITION OF POLYESTER, POLYAMIDE AND GLYCIDYL-MODIFIED POLYOLEFIN

[75] Inventor: Mitsuteru Mutsuda, Hyogo, Japan

[73] Assignee: Daicel Chemical Industries, Ltd., Tokyo, Japan

[21] Appl. No.: 854,486

[22] Filed: May 12, 1997

Related U.S. Application Data

[63] Continuation of Ser. No. 661,655, Jun. 11, 1996, abandoned, which is a continuation of Ser. No. 357,660, Dec. 16, 1994, abandoned.

[30] Foreign Application Priority Data

Dec. 28, 1993 [JP] Japan ................................. 5-336525
May 20, 1994 [JP] Japan ................................. 6-106592

[51] Int. Cl.$^6$ .................... C08L 51/06; C08L 67/04; C08L 51/04; C08L 77/10
[52] U.S. Cl. ..................... 525/66; 525/166; 525/169
[58] Field of Search ..................... 525/66, 166, 169

[56] References Cited

U.S. PATENT DOCUMENTS

| | | | |
|---|---|---|---|
| 5,017,651 | 5/1991 | Tomita et al. | 525/66 |
| 5,166,273 | 11/1992 | Kobayashi et al. | 525/286 |
| 5,244,970 | 9/1993 | Kobayashi et al. | 525/66 |
| 5,349,027 | 9/1994 | Ueki et al. | 525/331.7 |

FOREIGN PATENT DOCUMENTS

| | | |
|---|---|---|
| 2097511 | 4/1993 | Canada. |
| 0 409 152 | 1/1991 | European Pat. Off.. |
| 0 540 120 | 11/1991 | European Pat. Off.. |
| 0 522 163 | 1/1993 | European Pat. Off.. |
| 0 559 890 | 9/1993 | European Pat. Off.. |
| 0 559 892 | 9/1993 | European Pat. Off.. |
| 51-149350 | 12/1976 | Japan. |
| 60-188457 | 9/1985 | Japan. |
| 61-213257 | 9/1986 | Japan. |
| 1-178549 | 7/1989 | Japan. |
| 1-190755 | 7/1989 | Japan. |
| 1-284552 | 11/1989 | Japan. |
| 2-49057 | 2/1990 | Japan. |
| 2-305851 | 12/1990 | Japan. |
| 3-12449 | 1/1991 | Japan. |
| 3-149254 | 6/1991 | Japan. |
| 3-285932 | 12/1991 | Japan. |
| 4-25559 | 1/1992 | Japan. |
| 5-140499 | 6/1993 | Japan. |
| 5-287139 | 11/1993 | Japan. |

OTHER PUBLICATIONS

Database WPI, Week 9207, Derwent Publications Ltd., London, GB; AN 92-053126 & JP-A-3 296 633, 27 Dec. 1991.

Patent Abstracts of Japan, vol. 17, No. 663 (C-1138) 8 Dec. 1993 & JP-A-05 214 244, 24 Aug. 1993

Chemical Abstracts No. 121:135578 for Japanese Patent No. 60-73264, Polyplastics, Mar. 1994.

Japio Accession No. 89-178549 for Japanese Patent No. 1-178549, Toray Ind., Jul. 1989.

*Primary Examiner*—Robert E. Sellers
*Attorney, Agent, or Firm*—Flynn, Thiel, Boutell & Tanis, P.C.

[57] ABSTRACT

A thermoplastic resin composition comprises (A) a polyester resin, (B) a polyamide resin, (C) a modified polyolefin containing glycidyl-bearing structural units in an amount of $10^{-4}$ to $10^{-2}$ eq/g in terms of epoxy equivalent and (D) a quaternary phosphonium salt or a quaternary ammonium salt.

14 Claims, No Drawings

THERMOPLASTIC COMPOSITION OF POLYESTER, POLYAMIDE AND GLYCIDYL-MODIFIED POLYOLEFIN

This application is a continuation of U.S. Ser. No. 08/661,655, filed Jun. 11, 1996, abandoned, which is a continuation of U.S. Ser. No. 08/357,660 filed Dec. 16, 1994 abandoned.

FIELD OF THE INVENTION

The present invention relates to a novel thermoplastic resin composition based on a polyester resin and a polyamide resin.

PRIOR ART

Extensive studies have been made on resin blends of various polyester resins represented by polybutylene terephthalate with various polyamide resins represented by nylon 6 and nylon 66. Main objects of the studies are, for example, improvement in the impact characteristics and heat resistance of polybutylene terephthalate, improvement in the water absorptivity and moldability of polyamide and so forth. However, a composition prepared by mere blending of a thermoplastic polyester resin with a thermoplastic polyamide resin has a problem that polyamide phases or polyester phases aggregate. Therefore, an article molded from the composition has a defect that the aggregate phases peel off the surface in layers to result in not only poor surface appearance but also remarkably lowered impact strength. Thus, it was technically difficult to prepare a satisfactory alloy comprising a thermoplastic polyester resin and a thermoplastic polyamide resin.

In order to improve the impact characteristics of an alloy comprising a thermoplastic polyester resin and a thermoplastic polyamide resin, it has been a practice in the prior art to add an elastomer, including one modified by, for example, epoxidation. However, the addition of such an elastomer is causative of lowering in the mechanical properties (particularly modulus of elasticity) which are inherent in a thermoplastic polyester resin and a thermoplastic polyamide resin. Further, the addition thereof also brings about a remarkably lowered heat deformation temperature. Accordingly, the amount of the elastomer added must be limited, so that there has been prepared no alloy which comprises a thermoplastic polyester resin and a thermoplastic polyamide resin and has a high modulus of elasticity, a high heat deformation temperature and a high impact strength.

Further, JP-A 1-178549(1989) and JP-A 3-12449(1991) show a modified vinyl compound having an epoxy group such as glycidyl, added to a polymer alloy comprising a polyester resin and a polyamide resin. Those reference compounds have no amide group, nor aromatic group. This means they could not attain the objective effect sufficiently, because such a modified vinyl compound cannot exhibit any sufficient compatibilizing effect, when the polyester resin and the polyamide resin exhibit different reactivities with epoxy or exhibit different affinities for the vinyl compound owing to the backbone chain of the compound and because such a modified vinyl compound itself has generally such a poor strength as to be remarkably reduced also in impact strength.

JP-A 51-149350(1976), corresponding to U.S. Pat. No. 4,008,199, discloses such a resin composition containing a polycondensate of bisphenol A with epichlorohydrin (i.e., a phenoxy resin) with no stipulation on the ends of the polycondensate. That reference compound has no epoxy group at the terminal of its molecule and does not include an amide group.

JP-A 1-190755(1989), JP-A 2-49057(1990) and JP-A 4-25559(1992) disclose resin compositions containing an epoxy-terminated phenoxy resin. Those reference compounds have no amide group. Although the addition of such a phenoxy resin is effective in enhancing the impact strength and retaining the modulus of elasticity and, particularly characteristically, in retaining the high tensile elongation at the break point inherent in a polyester resin and a polyamide resin, these effects are remarkable only when the polyester resin content accounts for 100 to 80% by weight based on the whole composition, i.e., the effects are poor when the polyester resin content is less than 80% by weight. Accordingly, the above means are problematic when the polyamide content of the alloy is required to be enhanced for the purpose of improving the HDT or the like. Further, even when the polyester resin content is within a range of 100 to 80% by weight, the addition of the above phenoxy resin brings about a remarkable lowering in the HDT. In other words, the addition of an epoxy-terminated phenoxy resin has a problem of impairing the high heat resistance inherent in a polyamide resin, though it improves the impact characteristics of a polyester resin, particularly polybutylene terephthalate. This problem occurs also in using an epoxy-terminated brominated phenoxy resin as disclosed in Japanese Patent Laid-open No. 149254/1991.

SUMMARY OF THE INVENTION

The present invention aims at overcoming the above problems to provide a novel thermoplastic resin composition which is improved in mechanical properties (such as impact strength) without impairing the high heat resistance inherent in a polyamide resin. The present invention also aims at providing a composition which comprises a polyester resin and a polyamide resin and which exhibits a lowered water absorptivity and improved dimensional stability and is so well compatibilized as to be prevented from causing phase separation for a prolonged period, thus having excellent durability.

The inventors of the present invention have made intensive studies to solve the problems and have found out that a resin composition which is based on a polyester resin and a polyamide resin and which has excellent mechanical and thermal properties and others can surprisingly be prepared by adding both a polyolefin having an arylglycidyl group as a pendant and a quaternary phosphonium or ammonium salt to a blend of a polyester resin with a polyamide resin.

Namely, the present invention relates to a thermoplastic resin composition which essentially comprises (A) a polyester resin, (B) a polyamide resin, (C) a modified polyolefinic polymer containing glycidyl-bearing structural units represented by the following general formula (I) in an amount of $10^{-4}$ to $10^{-2}$ eq/g in terms of epoxy equivalent:

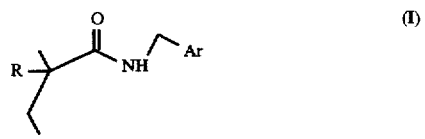

(I)

(wherein Ar represents an aromatic hydrocarbyl group having 6 to 20 carbon atoms and at least one glycidyloxy group; and R represents a hydrogen atom or a methyl group), and (D) a quaternary phosphonium salt represented by the following general formula (II) or a quaternary ammonium salt represented by the following general formula (III):

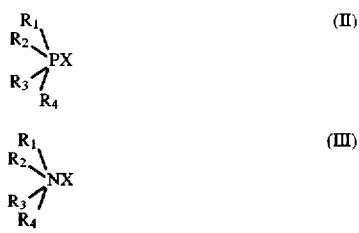

(wherein $R_1$ to $R_4$ each represent a hydrocarbyl group such as alkyl or aryl; and X represents a halogen atom), the weight ratio of the component (A) to the component (B) being between 5:95 and 95:5, the component (C) being contained in an amount of 1 to 50 parts by weight per 100 parts by weight of the sum of the components (A) and (B), and the component (D) being contained in an amount of 0.01 to 0.3 part by weight per 100 parts by weight of the component (A).

In other words, the invention provides a thermoplastic resin composition which comprises (A) a polyester resin, (B) a polyamide resin, (C) a modified polyolefin containing glycidyl units shown by the formula (I) in an amount of $10^{-4}$ to $10^{-2}$ eq/g in terms of epoxy equivalent:

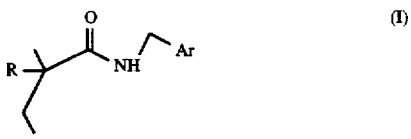

wherein Ar is an aromatic hydrocarbyl group having 6 to 20 carbon atoms and at least one glycidyloxy group and R is a hydrogen atom or methyl, and (D) a quaternary phosphonium salt having the formula (II) or a quaternary ammonium salt having the formula (III):

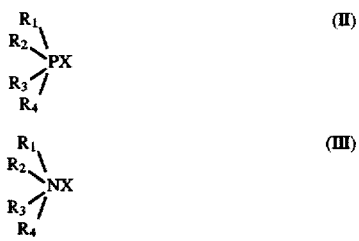

wherein $R_1$ to $R_4$ each are a hydrocarbyl group and X is a halogen atom, the weight ratio of the component (A) to the component (B) being between 5:95 and 95:5, the component (C) being contained in an amount of 1 to 50 parts by weight per 100 parts by weight of the sum in total of the components (A) and (B), the component (D) being contained in an amount of 0.01 to 0.3 part by weight per 100 parts by weight of the component (A).

The glycidyl olefin polymer (C) is characterized by having, in the glycidyl compound unit, an amide group, an aromatic group and a glycidyl group at the aromatic group and being terminated by the epoxy group.

It is preferable that $R_1$, $R_2$, $R_3$ and $R_4$ of the formulae (II) and (III) each are an alkyl or an aryl.

The modified polyolefin (C) is a polymerization product of an olefin and a glycidyl compound having the formula (I) or a reaction product of an olefin polymer or copolymer and a glycidyl compound having the formula (I).

The polyester (A) has a mole ratio of carboxyl to hydroxy of 30:70 to 100:0.

It is preferable that $R_1$, $R_2$, $R_3$ and $R_4$ of the formulae (II) and (III) each are an alkyl having 4 to 10 carbon atoms or phenyl and the halogen is bromine or iodine.

The composition may be obtained or obtainable by drying (A) and (B) and blending, kneading and injecting or extruding (A), (B), (C) and (D).

The present invention will now be described in detail.

The polyester resin (A) to be used in the present invention may be polyethylene terephthalate, polypropylene terephthalate, polybutylene terephthalate, polyarylate or the like. Although such a polyester resin generally has hydroxyl and/or carboxyl end groups or has a vinyl end group in some case, the polyester resin to be used in the present invention is preferably one having a carboxyl end group. Particularly, it is more desirable that the polyester resin have a higher molar ratio of carboxyl end group to hydroxyl end group, generally most desirably a carboxyl to hydroxyl molar ratio of 30/70.

The polyamide resin (B) to be used in the present invention may be a polymer prepared from a polymerizable amino carboxylic acid or an amide-forming derivative thereof, or one prepared from a suitable diamine and a suitable dicarboxylic acid or from amide-forming derivatives of them. Examples of the polyamide resin (B) include homopolymers such as nylon 4, nylon 46, nylon 6, nylon 7, nylon 8, nylon 11, nylon 12, nylon 66, nylon 69, nylon 610, nylon 611, nylon 612 and nylon 6T, mixtures of two or more of them, and copolymers of them. Further, the polyamide resin (B) may be also one which has an amino end group and so is reactive with a carboxyl-bearing modifier.

According to the present invention, it is preferable that the weight ratio of the polyester resin (A) to the polyamide resin (B) lie between 5:95 and 95:5. When the proportion of the polyester resin is too high, the modifying effect due to the polyamide resin will hardly be attained, while when the proportion of the polyamide resin is too high, the modifying effect due to the polyester resin will hardly be attained. Thus, when the weight ratio lies outside the above range, it is meaningless to blend the resins (A) and (B).

The modified polyolefin (C) to be used in the present invention is characterized by containing structural units represented by the following general formula (I), preferably by the following general formula (IV). The amount of the above units represented by the general formula (I) or (IV) in the modified polyolefin (C) is $10^{-4}$ to $10^{-2}$ eq/g, preferably $1.4 \times 10^{-4}$ to $10^{-3}$ eq/g in terms of epoxy equivalent per unit weight of the modified polyolefin (C). The polyolefin constituting the backbone chain of the modified polyolefin (C) may be polyethylene, polypropylene, poly(1-butene), poly (1-pentene), polyisobutene, a copolymer of two or more of the monomers constituting the polyolefins or a mixture of two or more of the polyolefins.

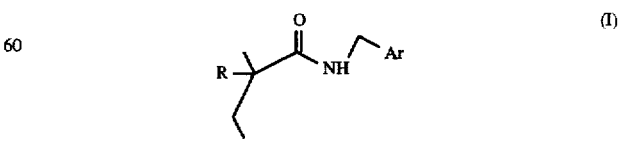

(wherein Ar represents an aromatic hydrocarbyl group having 6 to 20 carbon atoms and at least one glycidyloxy group; and R represents a hydrogen atom or a methyl group)

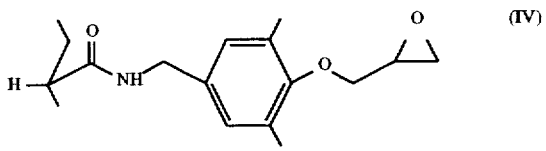

It is effective to add the modified polyolefin (C) in an amount of 1 to 50 parts by weight, preferably 3 to 30 parts by weight per 100 parts by weight of the sum of the polyester resin (A) and the polyamide resin (B). When the amount is less than 1 part by weight, only a poor compatibilizing effect will be attained, while when the amount exceeds 50 parts by weight, the characteristics inherent in a polyester resin and a polyamide resin (for example, excellent HDT and modulus of elasticity) will be impaired.

The quaternary phosphonium salt or quaternary ammonium salt (D) to be used in the present invention is one having a structure represented by the following general formula (II) or (III). Specific examples of the quaternary phosphonium salt include $[CH_3(CH_2)_3]_4PBr$, $(C_6H_5)_4PBr$ and $[CH_3(CH_2)_3]_4PCl$, while those of the quaternary ammonium salt include $[CH_3(CH_2)_3]_4NI$ and $[CH_3(CH_2)_4]_4NBr$.

  (II)

  (III)

(wherein $R_1$ to $R_4$ each represent a hydrocarbyl group such as alkyl or aryl; and X represents a halogen atom.

The addition of the above quaternary phosphonium or ammonium salt (D) is essential to the preparation of a composition which comprises (A) a polyester resin and (B) a polyamide resin and has excellent characteristics. The melting point of the quaternary salt varies depending upon the ligands, i.e., $R_1$ to $R_4$ and X, so that the ligands may be suitably selected depending upon the molding temperatures of the polyester resin and the polyamide resin. The amount of the quaternary salt to be added is 0.01 to 0.3 part by weight, preferably 0.02 to 0.2 part by weight, still preferably 0.04 to 0.15 part by weight per 100 parts by weight of the polyester resin used, though the amount varies depending upon the terminal carboxyl content of the polyester resin. When the amount is less than 0.01 part by weight, no effect will be attained, while when the amount exceeds 0.3 part by weight, no particularly remarkable effect will be attained.

The thermoplastic resin composition of the present invention may contain another thermoplastic resin as an auxiliary component in a small amount depending upon the object. The thermoplastic resin to be used as the auxiliary component may be any one which is stable at high temperature. Examples thereof include polyethylene, polycarbonate, polyphenylene sulfide, polyphenylene oxide, polyacetal, polysulfone, polyether sulfone, polyether imide, polyether ketone and a fluororesin. These thermoplastic resins may be used also as a mixture of two or more of them.

The thermoplastic resin composition of the present invention may suitably contain conventional additives for thermoplastic resins depending upon the performance required, and examples of such additives include stabilizers such as antioxidants and ultraviolet absorbers; antistatic agents, flame retardants, coloring agents such as dyes and pigments; lubricants, crystallization accelerators, nucleating agents, and composite reinforcements such as glass fiber. In particular, when a composite reinforcement such as glass fiber is added to the thermoplastic resin composition according to the present invention, the resulting composition is superior in impact resistance to the composition prepared by merely adding glass fiber to a blend of a polyester resin with a polyamide resin. The amount of the composite reinforcement (such as glass fiber) to be added is preferably 10 to 50% by weight based on the composition.

The composition of the present invention can be prepared by melt-kneading the above components (A), (B) (C) and (D) and various additives used at need together by a conventional method. Examples of the kneading machine to be used in this preparation include an extruder, Banbury mixer, super mixer, roll and kneader. It is advantageous that the preparation is conducted by melt-kneading the above components and additives with an extruder at a resin temperature of 220° to 300° C.

It is generally difficult to prepare a blend of different kinds of polymers which have excellent stability in extrusion without impairing the appearance of the molded article and the mechanical properties, because such polymers are hardly compatible with each other. According to the present invention, an epoxidized polyolefin and a quaternary phosphonium or ammonium salt are added to a blend of a thermoplastic polyester resin with a thermoplastic polyamide resin, by which a fine homogeneous dispersion of the resins in each other can be attained to give a molding material having excellent heat resistance and which is improved in resistance to hydrolysis as compared with the polyester resin and in water absorptivity as compared with the polyamide resin without impairing the excellent characteristics inherent in the resins.

EXAMPLE

The present invention will now be described specifically by referring to the following Examples, though the present invention is not limited to them but includes all embodiments so far as they do not deviate from the gist of the present invention. In the following Examples and Comparative Examples, all parts and percentages are given by weight.

The raw materials used in the following Examples and Comparative Examples will first be described.

(raw material 1)

polybutylene terephthalate (a product of Polyplastics Co., Ltd., Duranex 600 FP), terminal carboxyl content: 45 meq/ kg, terminal hydroxyl content: 30 meq/kg, terminal carboxyl/terminal hydroxyl ratio: 60/40 (by mole)

(raw material 2)

polybutylene terephthalate (a product of Polyplastics Co., Ltd., Duranex 800 FP), terminal carboxyl content: 38 meq/ kg, terminal hidroxyl content: 20 meq/kg, terminal carboxyl/ terminal hydroxyl ratio: 65/35 (by mole)

(raw material 3)

polybutylene terephthalate (a product of Polyplastics Co., Ltd., Duranex 200 FP), terminal carboxyl content: 40 meq/ kg, terminal hydroxyl content: 65 meq/kg, terminal carboxyl/terminal hydroxyl ratio: 38/62 (by mole)

(raw material 4)

polybutylene terephthalate (a product of Polyplastics Co., Ltd., Duranex 400 FP), terminal carboxyl content: 50 meq/ kg, terminal hydroxyl content: 45 meq/kg, terminal carboxyl/terminal hydroxyl ratio: 53/47 (by mole)

(raw material 5)

nylon 66 (a product of Ube Industries, Ltd., nylon 66 2020B)

(raw material 6)

epoxidized ethylene-propylene copolymer rubber (modified EPR) with its basic structure represented as follows:

[Chemical structure: EPR backbone with amide linkage to 2,6-dimethylphenyl group bearing glycidyl ether]

(raw material 7)

epoxidized polypropylene (modified PP) corresponding to a polymer prepared by replacing the backbone chain of the raw material 6 by polypropylene (raw material 8)

tetrabutylphosphonium bromide ([CH$_3$(CH$_2$)$_3$]$_4$PBr, a product of Aldrich Chemical Company)

(raw material 9)

tetraphenylphosphonium bromide ((C$_6$H$_5$)$_4$PBr, a product of Aldrich Chemical Company)

(raw material 10)

tetrabutylammonium iodide ([CH$_3$(CH$_2$)$_3$]$_4$NI, a product of Aldrich Chemical Company)

(raw material 11)

GMA-modified AS resin (a product of Nippon Oil and Fats Co., Ltd., Marproof G1005SA)

(raw material 12)

epoxy-terminated bisphenol resin (a product of Tohto Kasei K.K., epoxy-terminated phenoxy resin YD 7020)

(raw material 13)

heat stabilizer (a product of Ciba-Geigy, hindered phenol heat stabilizer, Irganox 1010)

(raw material 14)

glass fiber (fiber diameter: 13 μm, cut length: 3 mm, surface treatment: epoxy)

Then, the process for preparing the raw materials 6 and 7, the method for melt-kneading the raw materials and the method for evaluation will be described.

The raw materials 6 and 7 (modified polyolefins) were prepared from the following starting materials:

starting material 1:

ethylene-propylene copolymer rubber (EPR)

propylene content: 70% melt flow rate (230° C., loading: 2.16 kg): 1.8 g/10 min.

starting material 2:

polypropylene (PP)

melt flow rate (230° C., loading: 2.16 kg): 1.7 g/10 min.

starting material 3:

modifier monomer

AXE: glycidyl compound represented by the following chemical formula (V) (a product of Kanegafuchi Chemical Industry Co., Ltd.)

[Chemical structure (V): CH$_2$=CHCNHCH$_2$— with C=O, attached to 2,6-dimethylphenyl ring bearing —O—CH$_2$—CH—CH$_2$ epoxide group]

starting material 4:

free-radical generator

POX: Perhexyne 25B (a product of Nippon Oil and Fats Co., Ltd.)

The preparation was conducted as follows:

The starting material 1 or 2 was dry-blended with the starting material 3 (modifier monomer) and the starting material 4 (free-radical generator) with a Henschel mixer at a ratio specified in Table 1 and the obtained blend was melt-kneaded in a twin-screw extruder having a diameter (φ) of 30 mm and an L/D ratio of 25 at 200° C. and 30 rpm to conduct graft polymerization.

TABLE 1

| Component | Amt. |
| --- | --- |
| starting material 1 (EPR) or starting material 2 (PP) | 100 |
| starting material 3 (AXE) | 6 |
| starting material 4 (POX) | 0.15 |

The raw material 6 (modified EPR) and 7 (modified PP) thus prepared were examined for epoxy content. The former had an epoxy content of 1.7×10$^{-4}$ eq/g, and the latter had an epoxy content of 2.0×10$^{-4}$ eq/g. Each epoxy content was determined by dissolving the modified EPR or PP prepared by the above process in boiling xylene to remove insolubles, adding methanol to the obtained solution to form a precipitate, pressing this precipitate into a thickness of about 50 μm, subjecting the resulting film to IR spectrophotometry, and calculating the area ratio of a peak (1648 cm$^{-1}$) assignable to the stretching of C=O bond of AXE to that (840 cm$^{-1}$) which is one of the peaks assignable to isotactic polypropylene.

The method for melt-kneading the raw materials and the method for evaluation are as follows:

(1) treatment prior to melt kneading

Both a polyester resin and a polyamide resin have a tendency to be hydrolyzed, so that they must be dried under suitable conditions prior to melt kneading. In the Examples and Comparative Examples which will be described below, the polyester and polyamide resins were dried with a hot air dyer at 110° C. for 4 hours prior to melt kneading.

(2) method for melt kneading

The raw materials were melt-kneaded together by the use of a twin-screw corotating extruder TEM 35 B mfd. by Toshiba Machine Co., Ltd. at 270° C. to give pellets.

(3) method for injection molding

The pellets prepared above were dried at 110° C. for 4 hours and thereafter injection-molded.

The pellets were injection-molded into a predetermined test piece with an injection molding machine IS 100 E mfd. by Toshiba Machine Co., Ltd. at 270° C. (the same as the melt kneading temperature). The obtained test piece was examined for heat deformation temperature [sample thickness: 6.2 mm, flexure stress: 4.6 kgf/cm$^2$ and 18.6 kgf/cm$^2$, without annealing, hereinafter referred to as "HDT (low)" and "HDT (low)"] according to JIS K 7207. Further, the test piece was also examined for Izod impact strength (sample: 6.2×12.4×77 mm, notched on the gate side, hereinafter referred to as "IS") according to JIS K 7110.

The formulations of the compositions of the Examples are as specified in Tables 2 and 3 and those of the compositions of the Comparative Examples as specified in Tables 3 and 4, while the results of the Examples are given in Tables 5 and 6 and those of the Comparative Examples in Tables 6 and 7.

TABLE 2

| composition | Formulation (pt. by wt.) | | | | | | | | |
|---|---|---|---|---|---|---|---|---|---|
| | PBT | | PA | compatibilizing agent | | catalyst | | | stabilizer |
| raw material No. | raw material 1 | raw material 2 | raw material 5 | raw material 6 | raw material 7 | raw material 8 | raw material 9 | raw material 10 | raw material 13 |
| Ex. 1 | 80 | — | 20 | 3 | — | 0.05 | — | — | — |
| Ex. 2 | 80 | — | 20 | 5 | — | 0.05 | — | — | — |
| Ex. 3 | 80 | — | 20 | 5 | — | 0.05 | — | — | 0.5 |
| Ex. 4 | 70 | — | 30 | 5 | — | 0.10 | — | — | — |
| Ex. 5 | 60 | — | 40 | 5 | — | 0.05 | — | — | — |
| Ex. 6 | 60 | — | 40 | 10 | — | 0.05 | — | — | — |
| Ex. 7 | 30 | — | 70 | 5 | — | 0.05 | — | — | — |
| Ex. 8 | 20 | — | 80 | 5 | — | 0.05 | — | — | — |
| Ex. 9 | 80 | — | 20 | 5 | — | — | 0.05 | — | — |
| Ex. 10 | 80 | — | 20 | 5 | — | — | 0.10 | — | — |
| Ex. 11 | 80 | — | 20 | 5 | — | — | — | 0.05 | — |
| Ex. 12 | — | 80 | 20 | 5 | — | 0.05 | — | — | — |
| Ex. 13 | — | 70 | 30 | 5 | — | 0.05 | — | — | — |
| Ex. 14 | 80 | — | 20 | — | 15 | 0.05 | — | — | — |

TABLE 3

| composition | Formulation (pt. by wt.) | | | | | | |
|---|---|---|---|---|---|---|---|
| | PBT | | PA | compatibilizing agent | | catalyst | GF |
| raw material No. | raw material 3 | raw material 4 | raw material 5 | raw material 6 | raw material 7 | raw material 8 | raw material 14 |
| Ex. 15 | — | 53.6 | 13.4 | 3 | — | 0.05 | 30 |
| Ex. 16 | — | 50.4 | 12.6 | 7 | — | 0.05 | 30 |
| Ex. 17 | — | 47.2 | 11.8 | 11 | — | 0.05 | 30 |
| Ex. 18 | 20 | — | 47 | 3 | — | 0.05 | 30 |
| Ex. 19 | 19 | — | 45 | 6 | — | 0.05 | 30 |
| Comp. Ex. 1 | — | 56 | 14 | — | — | — | 30 |

TABLE 4

| composition | Formulation (pt by wt.) | | | | | | | |
|---|---|---|---|---|---|---|---|---|
| | PBT | | PA | compatibilizing agent | | catalyst | additive | |
| raw material No. | raw material 1 | raw material 2 | raw material 5 | raw material 6 | raw material 7 | raw material 8 | raw material 11 | raw material 12 |
| Comp. Ex. 2 | 80 | — | 20 | 3 | — | — | — | — |
| Comp. Ex. 3 | 80 | — | 20 | — | — | — | 3 | — |
| Comp. Ex. 4 | 80 | — | 20 | — | — | 0.05 | 3 | — |
| Comp. Ex. 5 | 80 | — | 20 | — | — | — | — | 3 |
| Comp. Ex. 6 | 80 | — | 20 | — | — | — | — | 5 |
| Comp. Ex. 7 | — | 80 | 20 | — | — | — | — | 5 |
| Comp. Ex. 8 | — | 70 | 30 | — | — | — | — | 5 |
| Comp. Ex. 9 | 80 | 20 | 30 | — | — | 0.05 | — | 3 |

TABLE 5

|        | Heat deformation temp. (°C.) | | notched Izod impact strength |
|--------|--------|--------|--------|
|        | low loading | high loading | (kg · cm/cm) |
| Ex. 1  | 200 | 110 | 5.0 |
| Ex. 2  | 200 | 110 | 6.0 |
| Ex. 3  | 200 | 110 | 6.0 |
| Ex. 4  | 200 | 100 | 5.0 |
| Ex. 5  | 205 | 115 | 6.0 |
| Ex. 6  | 200 | 105 | 7.5 |
| Ex. 7  | 225 | 125 | 5.0 |
| Ex. 8  | 235 | 125 | 6.0 |
| Ex. 9  | 190 | 105 | 5.0 |
| Ex. 10 | 190 | 105 | 5.5 |
| Ex. 11 | 190 | 100 | 5.0 |
| Ex. 12 | 195 | 100 | 9.5 |
| Ex. 13 | 210 | 120 | 11.5 |
| Ex. 14 | 190 | 110 | 7.0 |

*heat deformation temperature (HDT):

low loading: 4.6 kgf/cm$^2$ high loading: 18.6 kgf/cm$^2$

TABLE 6

|        | Heat deformation temp. (°C.) | | notched Izod impact strength |
|--------|--------|--------|--------|
|        | low loading | high loading | (kg · cm/cm) |
| Ex. 15 | 225 | 215 | 10.0 |
| Ex. 16 | 225 | 210 | 12.0 |
| Ex. 17 | 220 | 210 | 14.0 |
| Ex. 18 | 257 | 242 | 11.0 |
| Ex. 19 | 255 | 240 | 13.0 |
| Comp. Ex. 1 | 225 | 215 | 8.0 |

*heat deformation temperature (HDT):

low loading: 4.6 kgf/cm$^2$ high loading: 18.6 kgf/cm$^2$

TABLE 7

|        | Heat deformation temp. (°C.) | | notched Izod impact strength |
|--------|--------|--------|--------|
|        | low loading | high loading | (kg · cm/cm) |
| Comp. Ex. 2 | 180 | 90  | 2.5 |
| Comp. Ex. 3 | 185 | 90  | 2.0 |
| Comp. Ex. 4 | 185 | 90  | 2.0 |
| Comp. Ex. 5 | 175 | 75  | 4.0 |
| Comp. Ex. 6 | 170 | 75  | 4.5 |
| Comp. Ex. 7 | 170 | 80  | 4.5 |
| Comp. Ex. 8 | 175 | 80  | 3.0 |
| Comp. Ex. 9 | 185 | 100 | 3.0 |

*heat deformation temperature (HDT):

low loading: 4.6 kgf/cm$^2$ high loading: 18.6 kgf/cm$^2$

What is claimed is:

1. A thermoplastic resin composition which comprises (A) a polyester resin, (B) a polyamide resin, (C) a modified polyolefin containing glycidyl units shown by the formula (IA) in an amount of $10^{-4}$ to $10^{-2}$ eq/g in terms of epoxy equivalent:

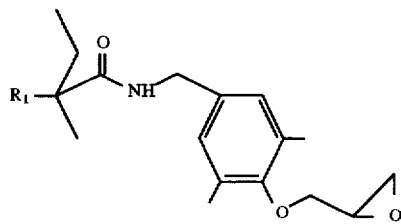

wherein $R_1$ is H or methyl, and (D) a quaternary phosphonium salt having the formula (II) or a quaternary ammonium salt having the formula (III):

wherein $R_1$–$R_4$ are independently each a hydrocarbyl group and X is a halogen atom, the weight ratio of the component (A) to the component (B) being from 30:70 to 70:30, the component (C) being contained in an amount of 1 to 50 parts by weight per 100 parts by weight of the sum in total of the components (A) and (B), the component (D) being contained in an amount of 0.01 to 0.1 part by weight per 100 parts by weight of the component (A).

2. A thermoplastic resin composition which consists essentially of (A) a polyester resin, (B) a polyamide resin, (C) a modified polyolefin containing glycidyl units shown by the formula (IA) in an amount of $10^{-4}$ to $10^{-2}$ eq/g in terms of epoxy equivalent:

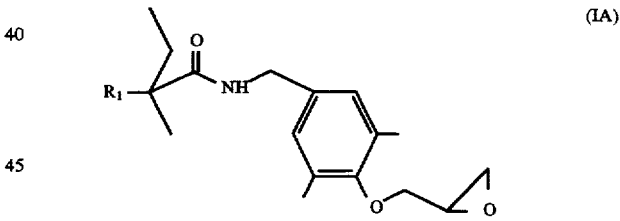

wherein $R_1$ is H or methyl, and (D) a quaternary phosphonium salt having the formula (II) or a quaternary ammonium salt having the formula (III):

wherein $R_1$–$R_4$ are independently each a hydrocarbyl group and X is a halogen atom, the weight ratio of the component (A) to the component (B) being from 30:70 to 70:30, the component (C) being contained in an amount of 1 to 50 parts by weight per 100 parts by weight of the sum in total of the components (A) and (B), the component (D) being contained in an amount of 0.01 to 0.1 part by weight per 100 parts by weight of the component (A).

3. The composition as claimed in claim 1, wherein the polyolefin moiety of (C) is selected from among polyethylene, polypropylene, poly(1-butene), poly(1-pentene), polyisobutene, copolymers of two or more of the monomers constituting the polyolefins or a blend of two or more of the polyolefins.

4. The composition as claimed in claim 1, wherein $R_1$ in formula (IA) is H.

5. The composition as claimed in claim 2, wherein $R_1$ in formula (IA) is H.

6. The composition as claimed in claim 1, wherein the polyester resin (A) is polybutylene terephthalate.

7. The composition as claimed in claim 1, wherein the polyamide rein (B) is nylon 66.

8. The composition as claimed in claim 1 wherein the quaternary phosphonium salt of (D) is $[CH_3(CH_2)_3]_4PBr$ or $(C_6H_5)_4PBr$.

9. The composition as claimed in claim 1, wherein the quaternary ammonium salt of (D) is $[CH_3(CH_2)_3]_4NI$.

10. The composition as claimed in claim 1, wherein $R_1$, $R_2$, $R_3$ and $R_4$ of the formulae (II) and (III) each are an alkyl or an aryl.

11. The composition as claimed in claim 1, wherein (A) has a mole ratio of carboxyl to hydroxy of 30:70 to 100:0.

12. The composition as claimed in claim 1, wherein $R_1$, $R_2$, $R_3$ and $R_4$ of the formulae (II) and (III) each are an alkyl having 4 to 10 carbon atoms or phenyl and the halogen is bromine or iodine.

13. The composition as claimed in claim 1, wherein the polyolefin is an ethylene-propylene copolymer, the polyamide resin (B) is nylon 66, the polyester resin (A) is polybutylene terephthalate and (D) is tetrabutylphosphonium bromide.

14. The composition as claimed in claim 1, which is obtained by drying (A) and (B) and blending, kneading and injecting or extruding (A), (B), (C) and (D).

* * * * *